United States Patent
Wu et al.

(10) Patent No.: US 9,626,195 B2
(45) Date of Patent: Apr. 18, 2017

(54) BOOTING SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kang Wu, Shenzhen (CN); Guo-Yi Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 37 days.

(21) Appl. No.: 14/735,767

(22) Filed: Jun. 10, 2015

(65) Prior Publication Data

US 2016/0335095 A1    Nov. 17, 2016

(30) Foreign Application Priority Data

May 11, 2015   (CN) .......................... 2015 1 0235220

(51) Int. Cl.
   *G06F 9/00* (2006.01)
   *G06F 9/44* (2006.01)
   *G06F 1/26* (2006.01)

(52) U.S. Cl.
   CPC .............. *G06F 9/4403* (2013.01); *G06F 1/26* (2013.01)

(58) Field of Classification Search
   CPC ................................. G06F 9/4403; G06F 1/26
   USPC .............. 713/2, 340, 300; 323/283; 365/226
   See application file for complete search history.

(56) References Cited

U.S. PATENT DOCUMENTS

| 6,327,663 | B2* | 12/2001 | Isaac ......................... G06F 1/26 713/1 |
| 8,745,366 | B2* | 6/2014 | Wyatt ....................... G09G 5/36 345/522 |
| 8,972,754 | B2* | 3/2015 | Wu ........................... G06F 1/26 713/1 |
| 2009/0158071 | A1* | 6/2009 | Ooi ........................ G06F 11/30 713/340 |
| 2011/0234639 | A1* | 9/2011 | Shimotani .......... G01C 21/3664 345/661 |
| 2012/0054481 | A1* | 3/2012 | Walker .................. G06F 9/4401 713/2 |
| 2012/0290854 | A1* | 11/2012 | Feng ......................... G06F 1/28 713/300 |
| 2012/0311367 | A1* | 12/2012 | Fu ............................. G06F 1/30 713/340 |
| 2013/0016578 | A1* | 1/2013 | Wu ........................... G06F 1/26 365/226 |

(Continued)

*Primary Examiner* — Aurel Prifti
(74) *Attorney, Agent, or Firm* — Steven Reiss

(57) ABSTRACT

A booting system includes a control module, a voltage regulation module, a complex programmable logic device (CPLD), and a power supply unit (PSU). The control module is configured to output a booting signal. The CPLD is coupled to the control module for receiving the booting signal and is configured to sense status of the voltage regulation module, a power control signal is outputted from the CPLD when the CPLD receives the booting signal and status of the voltage regulation module are normal. The PSU is coupled to the CPLD for receiving the power control signal from the CPLD and outputs a power signal for booting up a computer.

2 Claims, 1 Drawing Sheet

(56) References Cited

U.S. PATENT DOCUMENTS

2013/0043853 A1* 2/2013 Fu .......................... G06F 1/26
323/283
2014/0129821 A1* 5/2014 Tian .................. G06F 11/2733
713/2

* cited by examiner

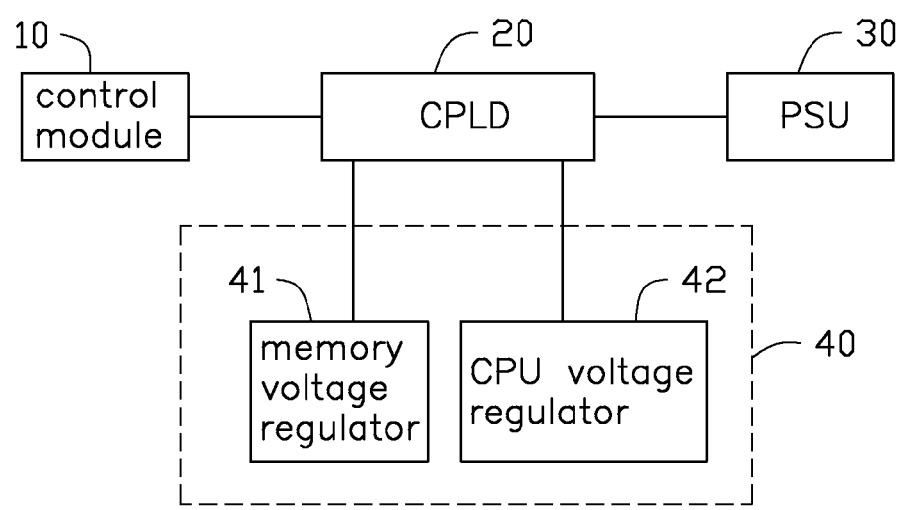

BOOTING SYSTEM

FIELD

The subject matter herein generally relates to a booting system.

BACKGROUND

A voltage regulation module for a central processing unit (CPU) or a memory is located on a motherboard. When the voltage regulation module is out of work and the motherboard is power, components on the motherboard could be broken down.

BRIEF DESCRIPTION OF THE DRAWINGS

Implementations of the present technology will now be described, by way of example only, with reference to the attached FIGURE.

The FIGURE is a block diagram of an embodiment of a booting system.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a booting system 1.

The FIGURE illustrates an embodiment of the booting system 1 of a electronic device. The booting system 1 can comprise a control module 10, a complex programmable logic device (CPLD) 20, a power supply unit (PSU) 30, and a voltage regulation module 40. In the embodiment, the voltage regulation module 40 can comprise a memory voltage regulator 41 and a central processing unit (CPU) voltage regulator 42.

The control module 10 is configured to output a booting signal. In the embodiment, the electronic device is a computer and the control module 10 is a platform controller hub (PCH). In the other embodiments, the electronic device is a server or any other electronic device having the voltage regulation module 40.

The CPLD 20 is coupled to the control module 10 for receiving the booting signal. The PSU 30 is coupled to the CPLD 20 for receiving a power control signal from the CPLD 20. A power signal is outputted from the PSU 30 when the PSU 30 receives the power control signal, then the computer boots. The CPLD 20 is also coupled to the memory voltage regulator 41 and the CPU voltage regulator 42, for sensing status of the memory voltage regulator 41 and the CPU voltage regulator 42.

When a power button of the computer is pressed to power on, the booting signal is outputted from the control module 10 to the CPLD 20. The CPLD 20 senses the status of the memory voltage regulator 41 and the CPU voltage regulator 42. The power control signal is outputted from the CPLD 20 to the PSU 30 when the status of the memory voltage regulator 41 and the CPU voltage regulator 42 are normal. The PSU 30 outputs the power signal and the computer boots up.

When the status of the memory voltage regulator 41 or the CPU voltage regulator 42 is abnormal, that is the memory voltage regulator 41 or the CPU voltage regulator 42 is out of work, no signal is received by the PSU 30. The computer dose not boot up for keeping the voltage regulation module 40 safe from damaging the computer.

The embodiment shown and described above is only example. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A booting system comprising:
   a control module configured to output a booting signal;
   a voltage regulation module directly coupled to the control module;
   a complex programmable logic device (CPLD) coupled to the control module for receiving the booting signal, the CPLD configured to sense the status of the voltage regulation module, wherein when the CPLD receives the booting signal and the status of the voltage regulation module is normal, a power control signal is outputted from the CPLD; and
   a power supply unit (PSU) coupled to the CPLD and configured to receive the power control signal from the CPLD and output a power signal for booting;
   wherein the voltage regulation module comprises a memory voltage regulator and a central processing unit (CPU) voltage regulator.

2. The booting system of claim 1, wherein the control module is a platform controller hub (PCH).

* * * * *